US010450951B2

(12) United States Patent
Rahaim et al.

(10) Patent No.: US 10,450,951 B2
(45) Date of Patent: Oct. 22, 2019

(54) CYCLONIC SEPARATOR FOR A TURBINE ENGINE

(71) Applicant: General Electric Company, Schenectady, NY (US)

(72) Inventors: John Joseph Rahaim, Cincinnati, OH (US); Corey Bourassa, Mechanicville, NY (US); Jared Peter Buhler, Tewksbury, MA (US); Jonathan Russell Ratzlaff, Loveland, OH (US)

(73) Assignee: General Electric Company, Schenectady, NY (US)

( * ) Notice: Subject to any disclaimer, the term of this patent is extended or adjusted under 35 U.S.C. 154(b) by 265 days.

(21) Appl. No.: 14/925,190

(22) Filed: Oct. 28, 2015

(65) Prior Publication Data

US 2017/0122202 A1    May 4, 2017

(51) Int. Cl.
*F02C 3/13* (2006.01)
*F02C 3/34* (2006.01)

(52) U.S. Cl.
CPC ............... *F02C 3/13* (2013.01); *F02C 3/34* (2013.01); *F05D 2220/32* (2013.01); *F05D 2260/60* (2013.01)

(58) Field of Classification Search
CPC .......... F02C 3/13; F02C 3/34; F05D 2220/32; F05D 2260/60
See application file for complete search history.

(56) References Cited

U.S. PATENT DOCUMENTS

| 3,895,930 | A  | * | 7/1975  | Campolong  | B01D 45/16 55/394 |
| 5,592,811 | A  | * | 1/1997  | Dodge      | F02C 3/20 422/182 |
| 5,918,458 | A  | * | 7/1999  | Coffinberry| F02C 7/185 60/785 |
| 6,508,052 | B1 | * | 1/2003  | Snyder     | B01D 45/08 137/15.1 |
| 6,792,762 | B1 | * | 9/2004  | Yamanaka   | F02C 7/185 415/115 |
| 8,613,199 | B2 | * | 12/2013 | Kimmel     | F01D 5/081 415/115 |

(Continued)

FOREIGN PATENT DOCUMENTS

EP    2 949 880 A1    12/2015

OTHER PUBLICATIONS

Extended European Search Report and Opinion issued in connection with corresponding EP Application No. 16194767.6 dated Mar. 23, 2017.

*Primary Examiner* — Jesse S Bogue
(74) *Attorney, Agent, or Firm* — McGarry Bair PC (57) ABSTRACT

A gas turbine engine comprising a cyclonic separator provides fluid communication between the compressor section and the turbine section. The cyclonic separator comprises an annular volume receiving a flow of cooling fluid from an inlet and dividing the airflow into a cleaner air outlet and a scavenge outlet. The flow of cooling fluid is provided to the cyclonic separator in a direction tangential to the annular volume such that a cyclonic flow of cooling fluid moves within the annular volume centrifugally separating particles entrained within the airflow to the radial outer area of the annular volume for removal through the scavenge outlet and providing a cleaner airflow to the cleaner air outlet.

15 Claims, 9 Drawing Sheets

(56) References Cited

U.S. PATENT DOCUMENTS

| | | |
|---|---|---|
| 2004/0221720 A1 | 11/2004 | Anderson et al. |
| 2008/0209914 A1 | 9/2008 | De Wergifosse et al. |
| 2011/0067409 A1* | 3/2011 | Beeck ..................... F01D 5/08 60/772 |
| 2013/0192257 A1* | 8/2013 | Horine ................... F01D 11/08 60/796 |
| 2014/0072420 A1* | 3/2014 | Johnson ................. F01D 5/081 415/183 |

* cited by examiner

CYCLONIC SEPARATOR FOR A TURBINE ENGINE

BACKGROUND OF THE INVENTION

Turbine engines, and particularly gas or combustion turbine engines, are rotary engines that extract energy from a flow of combusted gases passing through the engine onto a multitude of turbine blades. Gas turbine engines have been used for land and nautical locomotion and power generation, but are most commonly used for aeronautical applications such as for aircraft, including helicopters. In aircraft, gas turbine engines are used for propulsion of the aircraft. In terrestrial applications, turbine engines are often used for power generation.

Gas turbine engines for aircraft are designed to operate at high temperatures to maximize engine efficiency, so cooling of certain engine components, such as the high pressure turbine and the low pressure turbine, can be necessary. Typically, cooling is accomplished by ducting cooler air from the high and/or low pressure compressors to the engine components that require cooling. Temperatures in the high pressure turbine are around 1000° C. to 2000° C. and the cooling air from the compressor is about 500° C. to 700° C. While the compressor air is a high temperature, it is cooler relative to the turbine air, and can be used to cool the turbine. When cooling the turbines, cooling air can be supplied to various turbine components, including the interior of the turbine blades and the turbine shroud.

Particles, such as dirt, dust, sand, volcanic ash, and other environmental contaminants, in the cooling air can cause a loss of cooling and reduced operational time or "time-on-wing" for the aircraft environment. This problem is exacerbated in certain operating environments around the globe where turbine engines are exposed to significant amounts of airborne particles. Particles supplied to the turbine components can clog, obstruct, or coat the flow passages and surfaces of the components, which can reduce the lifespan of the components.

BRIEF DESCRIPTION OF THE INVENTION

A gas turbine engine comprising an engine core having a compressor section, a combustor section, and a turbine section in axial flow arrangement. The gas turbine engine further comprises a cooling air circuit fluidly coupling the compressor section to the turbine section and a cyclonic separator. The cyclonic separator comprises a housing defining an interior, a centerbody located within the interior to define an annular volume within the housing between the centerbody and the housing to form an annular cyclonic separating chamber, an inlet tangentially coupling the annular volume to the cooling air circuit, a cleaner air outlet coupling the annular volume to the cooling air circuit downstream of the inlet, and a scavenge outlet fluidly coupled to the annular volume.

An inducer assembly for a gas turbine engine comprising a disk comprising a plurality of circumferentially arranged inducers having a turning passage with an inlet and outlet, and defining a flow streamline, and a plurality of cyclonic separators paired with the inducers. The cyclonic separators have an annular cyclonic separating chamber with an air inlet, a cleaner air outlet, and a scavenge outlet, and define an annulus centerline. The air inlet is tangential to the annular separating chamber, the cleaner air outlet is coupled to the inducer inlet and defines a cleaner air outlet stream line, a the cleaner air outlet is coupled to the inducer inlet such that the cleaner air outlet stream line aligns with the inducer inlet stream line.

A gas turbine engine having an engine center line and at least one cyclonic separator circumferentially arranged about the engine center line, the at least one cyclonic separator having an annular cyclonic separating chamber with an air inlet, a cleaner air outlet, and a scavenge outlet, defining an annulus centerline. The air inlet is tangential to the annular separating chamber.

DESCRIPTION OF EMBODIMENTS OF THE INVENTION

The described embodiments of the present invention are directed to systems, methods, and other devices related to particle removal, particularly in a turbine engine, and more particularly to the removal of particles from a cooling airflow in a turbine engine. For purposes of illustration, the present invention will be described with respect to an aircraft gas turbine engine. It will be understood, however, that the invention is not so limited and can have general applicability in non-aircraft applications, such as other mobile applications and non-mobile industrial, commercial, and residential applications.

As used herein, the terms "axial" or "axially" refer to a dimension along a longitudinal axis of an engine or along a longitudinal axis of a component disposed within the engine. The term "forward" used in conjunction with "axial" or "axially" refers to moving in a direction toward the engine inlet, or a component being relatively closer to the engine inlet as compared to another component. The term "aft" used in conjunction with "axial" or "axially" refers to a direction toward the rear or outlet of the engine relative to the engine centerline.

As used herein, the terms "radial" or "radially" refer to a dimension extending between a center longitudinal axis of the engine, an outer engine circumference, or a circular or annular component disposed within the engine. The use of the terms "proximal" or "proximally," either by themselves or in conjunction with the terms "radial" or "radially," refers to moving in a direction toward the center longitudinal axis, or a component being relatively closer to the center longitudinal axis as compared to another component.

As used herein, the terms "tangential" or "tangentially" refer to a dimension extending perpendicular to a radial line with respect to the longitudinal axis of the engine or the longitudinal axis of a component disposed therein.

All directional references (e.g., radial, axial, upper, lower, upward, downward, left, right, lateral, front, back, top, bottom, above, below, vertical, horizontal, clockwise, counterclockwise) are only used for identification purposes to aid the reader's understanding of the disclosure, and do not create limitations, particularly as to the position, orientation, or use thereof. Connection references (e.g., attached, coupled, connected, and joined) are to be construed broadly and can include intermediate members between a collection of elements and relative movement between elements unless otherwise indicated. As such, connection references do not necessarily infer that two elements are directly connected and in fixed relation to each other. The exemplary drawings are for purposes of illustration only and the dimensions, positions, order and relative sizes reflected in the drawings attached hereto can vary.

The described disclosure is directed to a turbine blade, and in particular to cooling a turbine blade. For purposes of illustration, the present invention will be described with respect to a turbine blade for an aircraft gas turbine engine. It will be understood, however, that the invention is not so limited and can have general applicability in non-aircraft applications, such as other mobile applications and non-mobile industrial, commercial, and residential applications. It can also have application to airfoils, other than a blade, in a turbine engine, such as stationary vanes.

Figure 1:
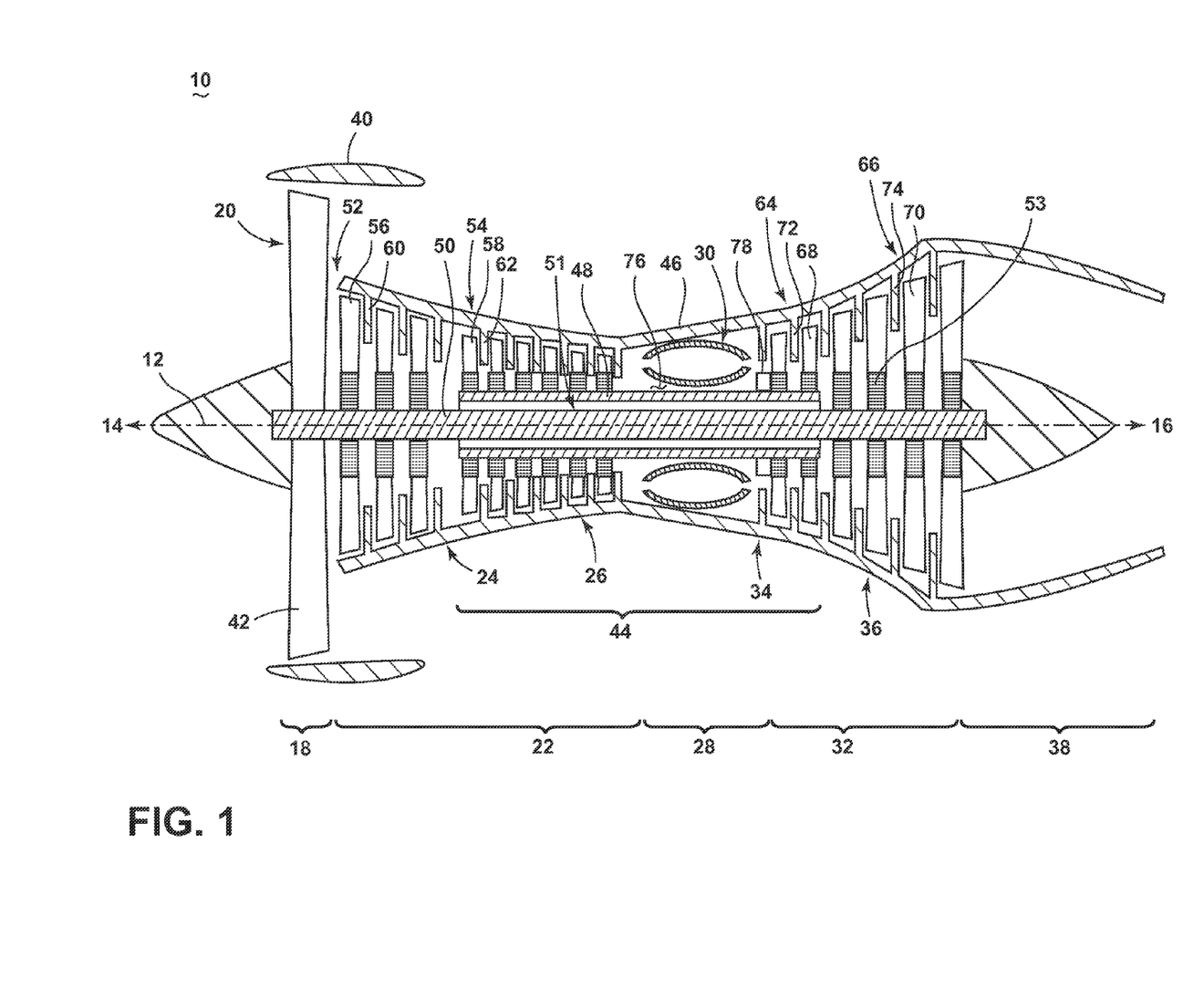
FIG. 1 is a schematic cross-sectional diagram of a gas turbine engine for an aircraft.

FIG. 1 is a schematic cross-sectional diagram of a gas turbine engine 10 for an aircraft. The engine 10 has a generally longitudinally extending axis or centerline 12 extending forward 14 to aft 16. The engine 10 includes, in downstream serial flow relationship, a fan section 18 including a fan 20, a compressor section 22 including a booster or low pressure (LP) compressor 24 and a high pressure (HP) compressor 26, a combustion section 28 including a combustor 30, a turbine section 32 including a HP turbine 34, and a LP turbine 36, and an exhaust section 38.

The fan section 18 includes a fan casing 40 surrounding the fan 20. The fan 20 includes a plurality of fan blades 42 disposed radially about the centerline 12. The HP compressor 26, the combustor 30, and the HP turbine 34 form a core 44 of the engine 10, which generates combustion gases. The core 44 is surrounded by core casing 46, which can be coupled with the fan casing 40.

A HP shaft or spool 48 disposed coaxially about the centerline 12 of the engine 10 drivingly connects the HP turbine 34 to the HP compressor 26. A LP shaft or spool 50, which is disposed coaxially about the centerline 12 of the engine 10 within the larger diameter annular HP spool 48, drivingly connects the LP turbine 36 to the LP compressor 24 and fan 20. The portions of the engine 10 mounted to and rotating with either or both of the spools 48, 50 are referred to individually or collectively as a rotor 51.

The LP compressor 24 and the HP compressor 26 respectively include a plurality of compressor stages 52, 54, in which a set of compressor blades 56, 58 rotate relative to a corresponding set of static compressor vanes 60, 62 (also called a nozzle) to compress or pressurize the stream of fluid passing through the stage. In a single compressor stage 52, 54, multiple compressor blades 56, 58 can be provided in a ring and can extend radially outwardly relative to the centerline 12, from a blade platform to a blade tip, while the corresponding static compressor vanes 60, 62 are positioned downstream of and adjacent to the rotating blades 56, 58. It is noted that the number of blades, vanes, and compressor stages shown in FIG. 1 were selected for illustrative purposes only, and that other numbers are possible. The blades 56, 58 for a stage of the compressor can be mounted to a disk 53, which is mounted to the corresponding one of the HP and LP spools 48, 50, with each stage having its own disk. The vanes 60, 62 are mounted to the core casing 46 in a circumferential arrangement about the rotor 51.

The HP turbine 34 and the LP turbine 36 respectively include a plurality of turbine stages 64, 66, in which a set of turbine blades 68, 70 are rotated relative to a corresponding set of static turbine vanes 72, 74 (also called a nozzle) to extract energy from the stream of fluid passing through the stage. In a single turbine stage 64, 66, multiple turbine blades 68, 70 can be provided in a ring and can extend radially outwardly relative to the centerline 12, from a blade platform to a blade tip, while the corresponding static turbine vanes 72, 74 are positioned upstream of and adjacent to the rotating blades 68, 70. It is noted that the number of blades, vanes, and turbine stages shown in FIG. 1 were selected for illustrative purposes only, and that other numbers are possible.

In operation, the rotating fan 20 supplies ambient air to the LP compressor 24, which then supplies pressurized ambient air to the HP compressor 26, which further pressurizes the ambient air. The pressurized air from the HP compressor 26 is mixed with fuel in the combustor 30 and ignited, thereby generating combustion gases. Some work is extracted from these gases by the HP turbine 34, which drives the HP compressor 26. The combustion gases are discharged into the LP turbine 36, which extracts additional work to drive the LP compressor 24, and the exhaust gas is ultimately discharged from the engine 10 via the exhaust section 38. The driving of the LP turbine 36 drives the LP spool 50 to rotate the fan 20 and the LP compressor 24.

Some of the ambient air supplied by the fan 20 can bypass the engine core 44 and be used for cooling of portions, especially hot portions, of the engine 10, and/or used to cool or power other aspects of the aircraft. In the context of a turbine engine, the hot portions of the engine are normally downstream of the combustor 30, especially the turbine section 32, with the HP turbine 34 being the hottest portion as it is directly downstream of the combustion section 28. Other sources of cooling fluid can be, but is not limited to, fluid discharged from the LP compressor 24 or the HP compressor 26.

As such, a flow of air can bypass the combustor 30 through a bypass section 76 disposed radially inside and outside of the combustor 30 with respect to the engine centerline 12. An inducer section 78 can utilize the air from by bypass section 76 to provide an airflow for cooling downstream engine components, such as the vanes, blades, or shroud assembly, for example. The airflow is utilized as a cooling airflow having a lower temperature relative to the temperature of the airflow generated through the combustor 30.

Figure 2:
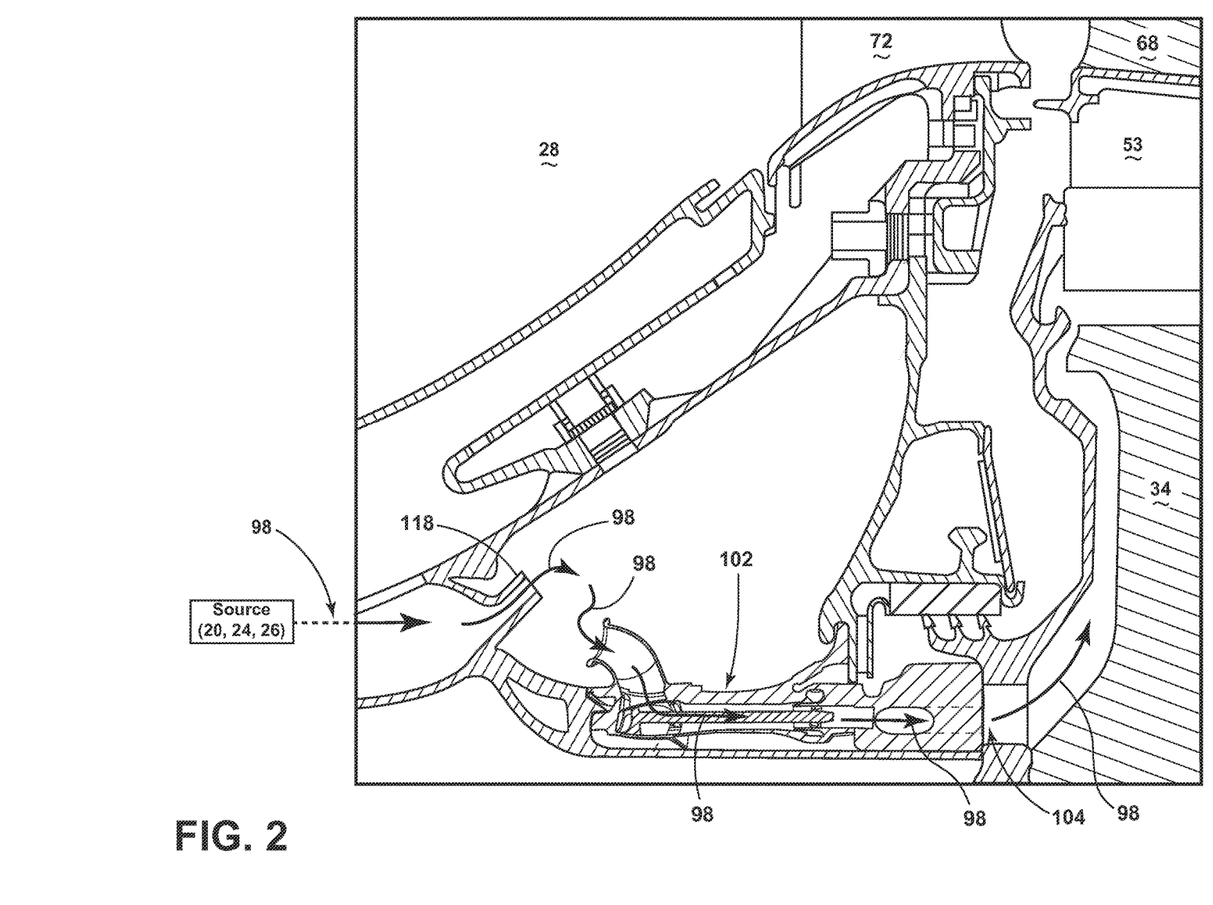
FIG. 2 is a schematic section view of a cooling air circuit comprising a cyclonic separator.

FIG. 2 is a schematic view of a section of the engine 10 adjacent the junction between the combustor section 28 and the turbine section 32 of FIG. 1, showing a cyclonic separator 102 coupled to an inducer section 104. The cyclonic separator 102 can be fed with a flow of cooling fluid to define a cooling circuit 98 bypassing the combustor section 28 radially inward of the combustor 30. As such, a bypass airflow from the compressor section 22, for example, can pass to the cyclonic separator 102 through an outlet guide vane 118, which is in fluid communication with the inducer section 104. From the inducer section 104, the cooling circuit 98 can feed the turbine section 34, and components therein such as the blade 68, the vane 72, disk 53, or a seal (not shown). It should be further appreciated that the outlet guide vane 118 as shown in FIG. 2 is exemplary and should not be understood as limiting.

Figure 3:
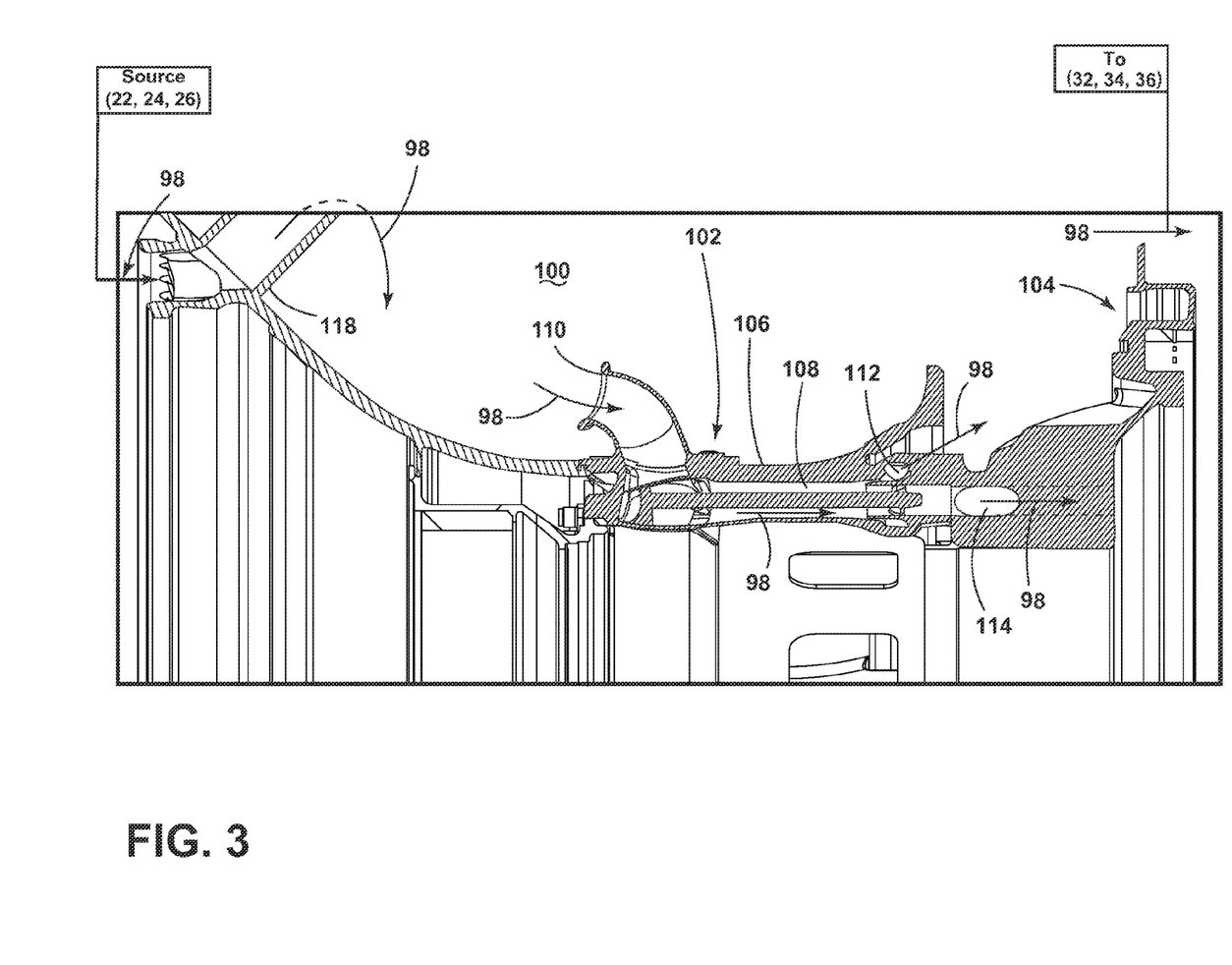
FIG. 3 is a close-up view of the section of the FIG. 2 showing the cyclonic separator.

FIG. 3 is a schematic view of a section 100 of the engine 10 of FIG. 2, showing the cyclonic separator 102 incorporated with the inducer section 104 disposed downstream of the cyclonic separator 102. The cyclonic separator 102 can comprise a housing 106 defining an annular interior 108. The interior 108 can be in fluid communication with the engine section 100 through an air inlet 110, and can exhaust a cooling fluid through a first outlet 112 and a second outlet 114. The second outlet 114 can further be in fluid communication with the inducer section 104. The cooling circuit 98 can be further defined by a flow of cooling fluid introduced into the engine section 100 from the outlet guide vane 118, for example. The flow of cooling fluid of the cooling circuit 98 can then flow into the cyclonic separator 102 through the inlet 110, pass through the interior 108, and exhaust through the outlets 112, 114 to the inducer section 104, where the cooling fluid can flow to the turbine section 32. Thus, the cooling circuit 98 comprises directing a flow of cooling fluid from the compressor section 22, through the cyclonic separator 102, and through the inducer section 104 to the turbine section 32, bypassing the combustor section 28.

Figure 4:
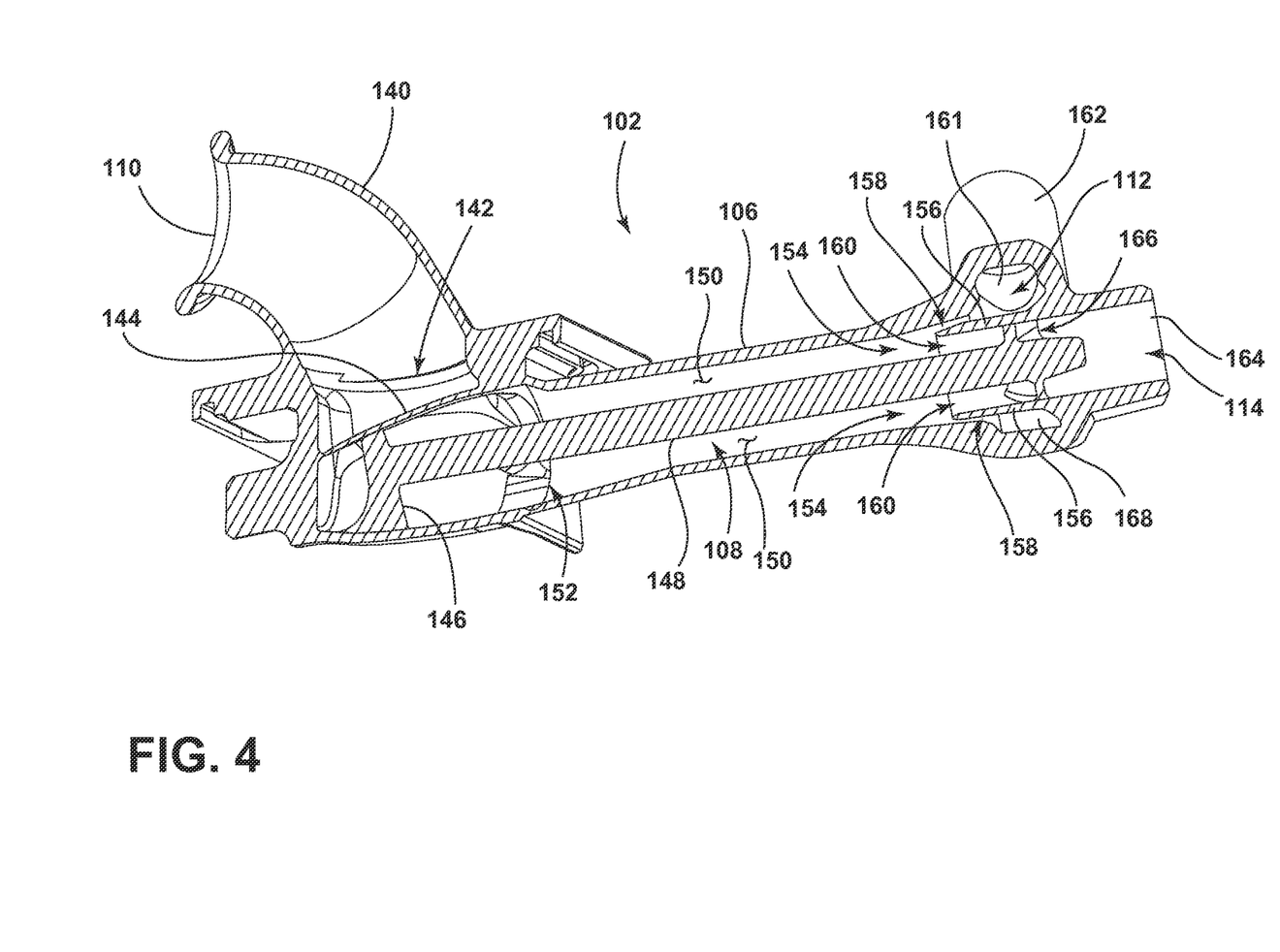
FIG. 4 is a cross-sectional view of the cyclonic separator of FIG. 3.

In FIG. 4, an inlet conduit 140 provides fluid communication from the external of the cyclonic separator 102 to the interior 108 through the inlet 110. The inlet 110 and the inlet conduit 140 can be annular with an arcuate cross-section. The inlet conduit 140 is in fluid communication with the interior 108 at a tangential injection area 142. A rib 144 is disposed partially between the inlet conduit 140 and the interior 108 for directing the flow of cooling fluid to one side of the interior 108. A rear wall 146 is disposed within the interior 108 coupled to an annular centerbody 148 extending longitudinally through the center of the interior 108. The centerbody 148 can be disposed axially parallel to the engine centerline 12 or can be angularly offset from parallel to the engine centerline 12. An annular volume 150 is defined by the centerbody 148 to form an annular cyclonic separating chamber disposed within the interior 108 of the housing 106 and extending between the tangential injection area 142 and the second outlet 114. The longitudinal extension of the annular volume 150 can define an annulus centerline or a cyclonic centerline that can be parallel to the engine centerline 12 or can be angularly offset from the engine centerline 12 with or without respect to the alignment of the centerbody 148. Furthermore, the annulus centerline or cyclonic centerline can be angularly offset by a compound angle, comprising both an axial and a radial dimension, such that the annulus centerline is offset relative to the engine centerline by the compound angle.

The annular volume 150 can comprise a reduced cross-sectional area 152 and an increased cross-sectional area 154 adjacent to the tangential injection area 142 and the first outlet 112, respectively. The reduced and increased cross-sectional areas 152, 154 can be continuously reducing or increasing. An acceleration portion is defined by the reduced cross-sectional area 152 to accelerate a flow of cooling air and a deceleration portion is defined by the increased cross-sectional area 154 to decelerate a flow of cooling air. The respective portions can accelerate and decelerate the airflow proportionally to the area of the cross-sections of the reduced and increased cross-sectional area 152, 154. The increased cross-sectional area 154 further provides space for an annular outlet conduit 156 disposed within the interior 108. The annular outlet conduit 156 separates the annular volume 150 into a radially outer volume 158 and a radially inner volume 160. The radially outer volume 158 provides fluid communication to a scavenge outlet 162 comprising the first outlet 112 and the radially inner volume provides fluid communication to a cleaner air outlet 164 comprising the second outlet 114 through a turning element illustrated as a deswirler 166. It should be understood that the deswirler 166 is optional and the cyclonic separator can be disposed without the deswirler 166. The scavenge outlet 162 can be disposed tangential to the annular volume 150. The scavenge outlet 162 can further define an air inlet 161 at the junction between the annular volume 150 and the scavenge outlet 162. The air inlet 161 can comprise a reduced cross-sectional area to accelerate a flow of air passing into the scavenge outlet 162. The radially outer volume 158 terminates at an annular scavenge volume 168 such that any cooling fluid disposed within the radially outer volume 158 can be provided to the scavenge outlet 162 around the annular outlet conduit 156.

Figure 5:
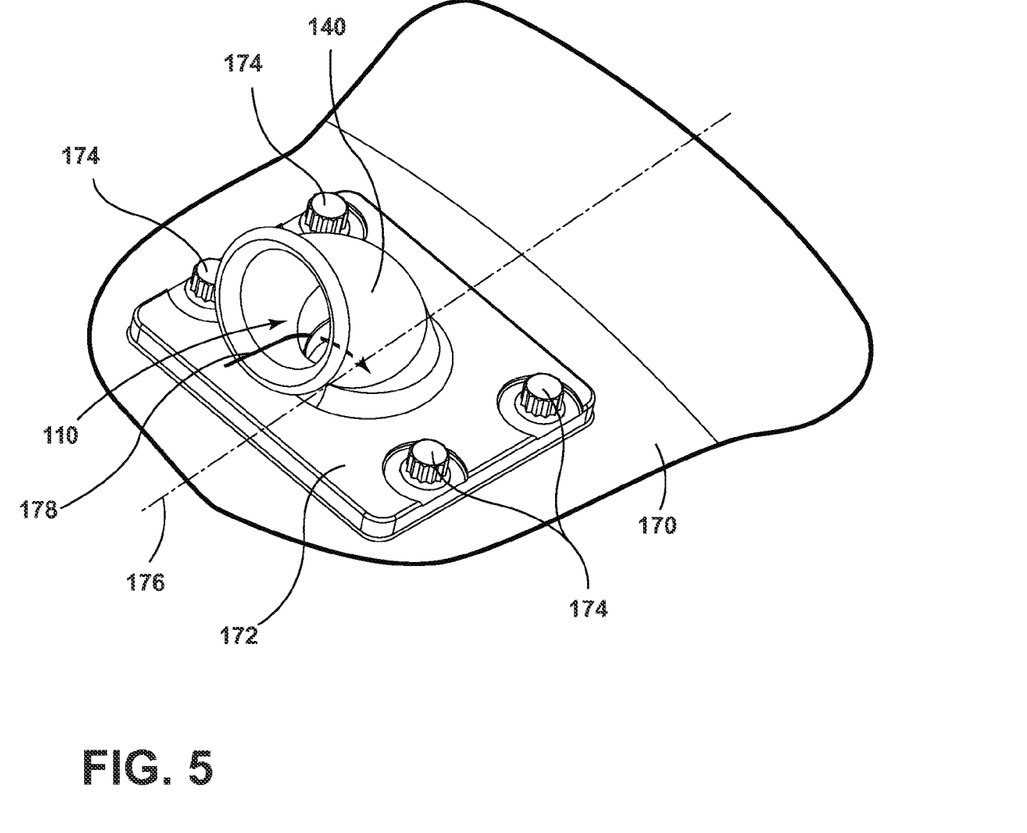
FIG. 5 is a perspective view of an inlet for the cyclonic separator of FIG. 3.

FIG. 5 illustrates the inlet 110 of the cyclonic separator 102 mounted to an annular band 170. A mount 172 fastens the inlet 110 to the cyclonic separator 102 with a plurality of fasteners 174. A transposed axis 176 is illustrated axially through the center of the mount 172, parallel to the engine centerline 12. Relative to the transposed axis 176, the inlet 110 can receive a flow of cooling fluid in a substantially axial direction and turn the flow of cooling fluid with the arcuate inlet conduit 140 to have a radial orientation when entering the annular volume 150, relative to the axial orientation of the cyclonic separator 102, as illustrated by arrow 178.

It should be understood that the inlet 110 as illustrated is exemplary. While the inlet 110 is shown as accepting a generally axial airflow from the with respect to the engine centerline 12, the inlet 110 can be oriented in a plurality of directions, such as partially angled upward or downward or to one side, for example, accepting airflows from a plurality of directions.

Figure 6:
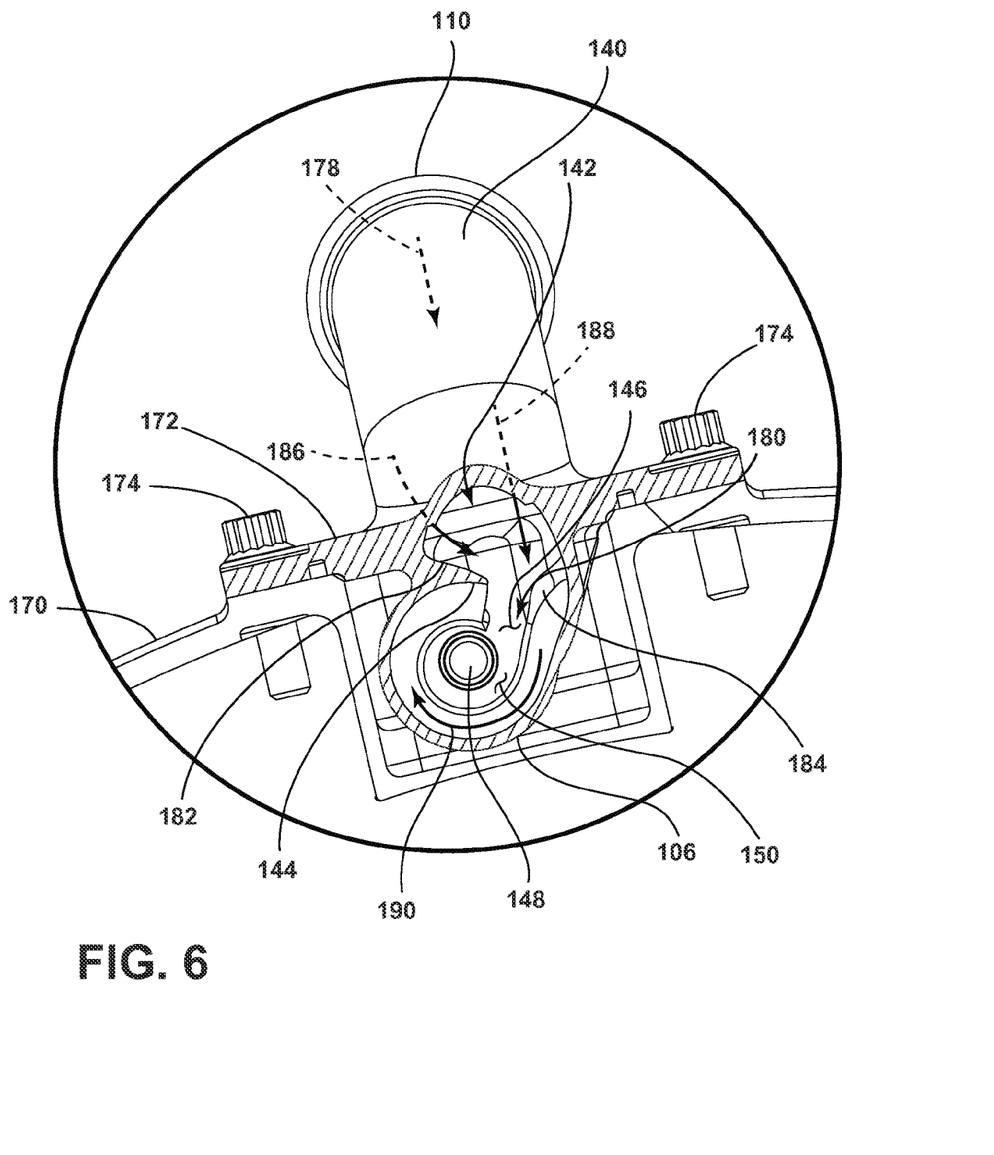
FIG. 6 is a radial cross-sectional view of the cyclonic separator of FIG. 3 illustrating a tangential injection conduit.

FIG. 6 illustrates a radial cross section of the inlet 110 at the tangential injection area 142. The inlet conduit 140 is in fluid communication with the annular volume 150 through the tangential injection area 142 at a tangential inlet 180 defined between the radially outer surface 182 of the rib 144 and a sidewall 184 defined within the housing 106.

A flow of cooling fluid entering the inlet 110 at 178 is turned within the inlet conduit 140 from having a substantially axial direction to having both a radial and an axial direction relative to the engine centerline 12, moving radially inward as illustrated in FIG. 5. The flow of cooling fluid at 186 from the inlet conduit 140 is directed toward the sidewall 184 by the rib 144 and a flow of cooling fluid at 188 and from 186 is guided by the sidewall 184 to have a tangential direction when entering the annular volume 150 relative to the annular orientation of the annular volume 150. As such, the tangential injection area 142 directs the flow of cooling fluid into the annular volume 150 tangentially such that the flow of cooling fluid at 190 can swirl in a cyclonic manner around the centerbody 148 within the annular volume 150, moving in an axially aft direction through the cyclonic separator 102.

Figure 7:
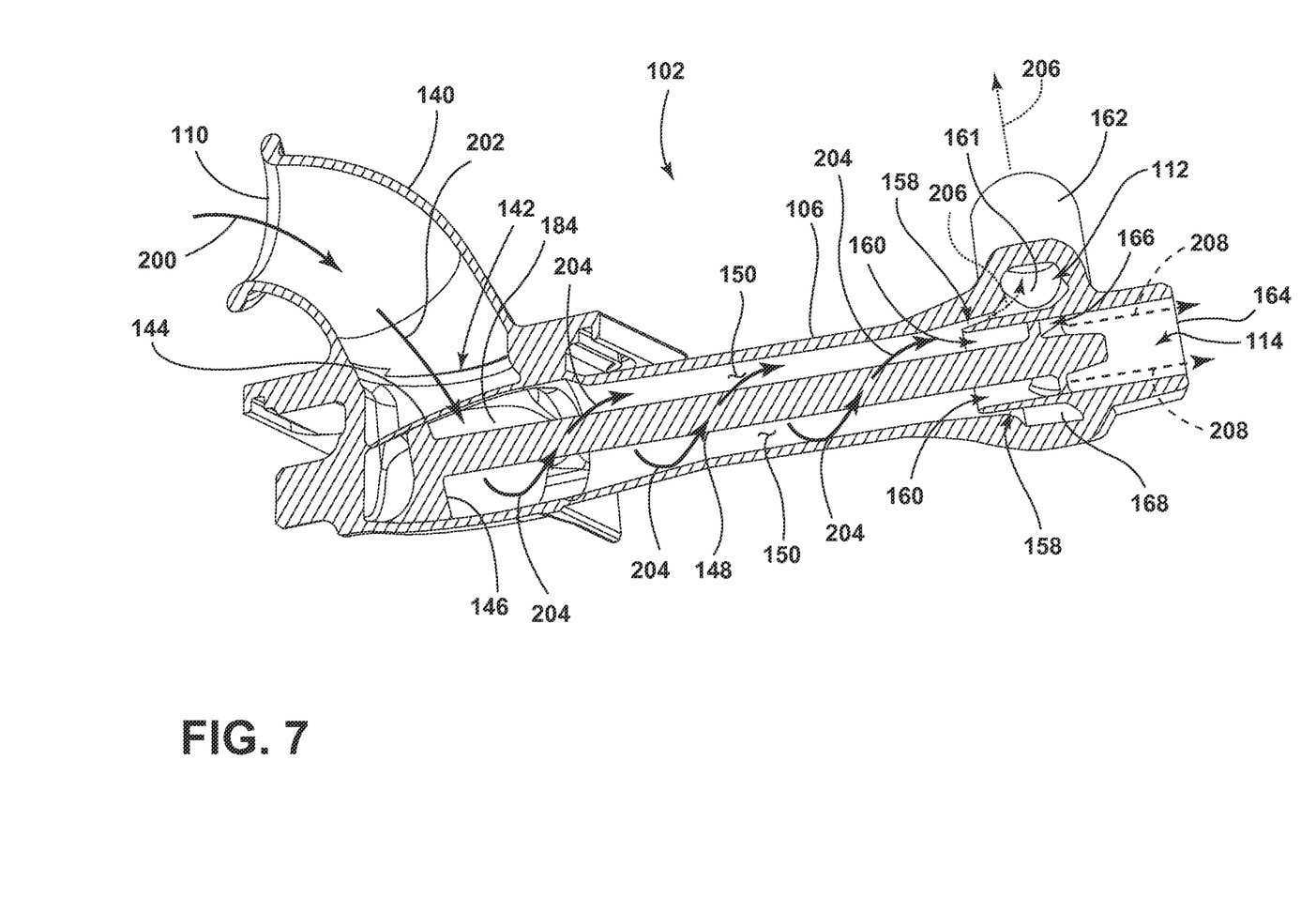
FIG. 7 is the cross-sectional view of FIG. 3 illustrating a flow path within the cyclonic separator.

In FIG. 7, the entirety of a flow of cooling fluid through the cyclonic separator can be appreciated. A flow of cooling fluid at 200 flows into the inlet 110 and is turned by the inlet conduit 140 to have both an axial and a radial direction at 202 when entering the cyclonic separator 102. At the tangential injection area 142, the flow of cooling fluid is directed toward the sidewall 184 such that the cooling fluid is injected into the annular volume 150 tangentially. The tangential injection of the cooling fluid causes the cooling fluid to helically swirl around the centerbody 148 as the cooling fluid passes through the cyclonic separator 102. The cooling fluid within the cyclonic separator 102 can comprise a cyclonic airflow 204, such that particulate matter entrained within the cooling fluid, such as dust, dirt, sand, ash, or otherwise moves toward the radially outer periphery of the annular volume 150 adjacent to the housing 106 by centrifugal force. The particulate matter along the outer periphery can pass into the radially outer volume 158 of the annular volume 150, such that a scavenge airflow at 206 can carry the particles into the scavenge outlet 162 and out through the first outlet 112. The remaining cooling fluid not comprising the scavenge airflow 206 can pass through the radially inner volume 160 as a cleaner airflow 208. The cleaner airflow 208 can pass through the deswirler 166, changing the helical magnitude of the airflow to an axial airflow. The cleaner airflow 208 can pass through the cleaner air outlet 164 at the second outlet 114. The first and second outlets 112, 114 can be disposed tangential to the annular volume 150 such that the need to deswirl the cyclonic airflow 204 is eliminated through tangential exhausting of the cooling fluid.

It should be appreciated that the deswirler 166 is optional. The cyclonic airflow can be deswirled through the deswirler 166. Furthermore, pressure losses associated with the low pressure center section of typical cyclonic separators is eliminated with the centerbody 148, reducing or eliminating the need to deswirl the airflow before passing the airflow out through the cleaner air outlet 164.

It should be understood that the cyclonic separator 102 can tangentially inject a flow of cooling fluid to create a helical or cyclonic airflow within the cyclonic separator 102. The cyclonic airflow utilizes centrifugal force to push particulate matter entrained within the airflow to the outer periphery of the cyclonic separator 102, separating the flow into a radially outer dirty flow and a radially inner cleaner airflow having an amount of particulate matter removed therefrom by the centrifugal force generated by the cyclonic flow. The separation of the radially inner and outer airflows operates to remove a volume of particulate matter from the flow of cooling fluid within the cooling circuit, such that problems associated with particular matter within a cooling fluid are reduced within engine components utilizing the cooling fluid of the cooling circuit.

Figure 8:
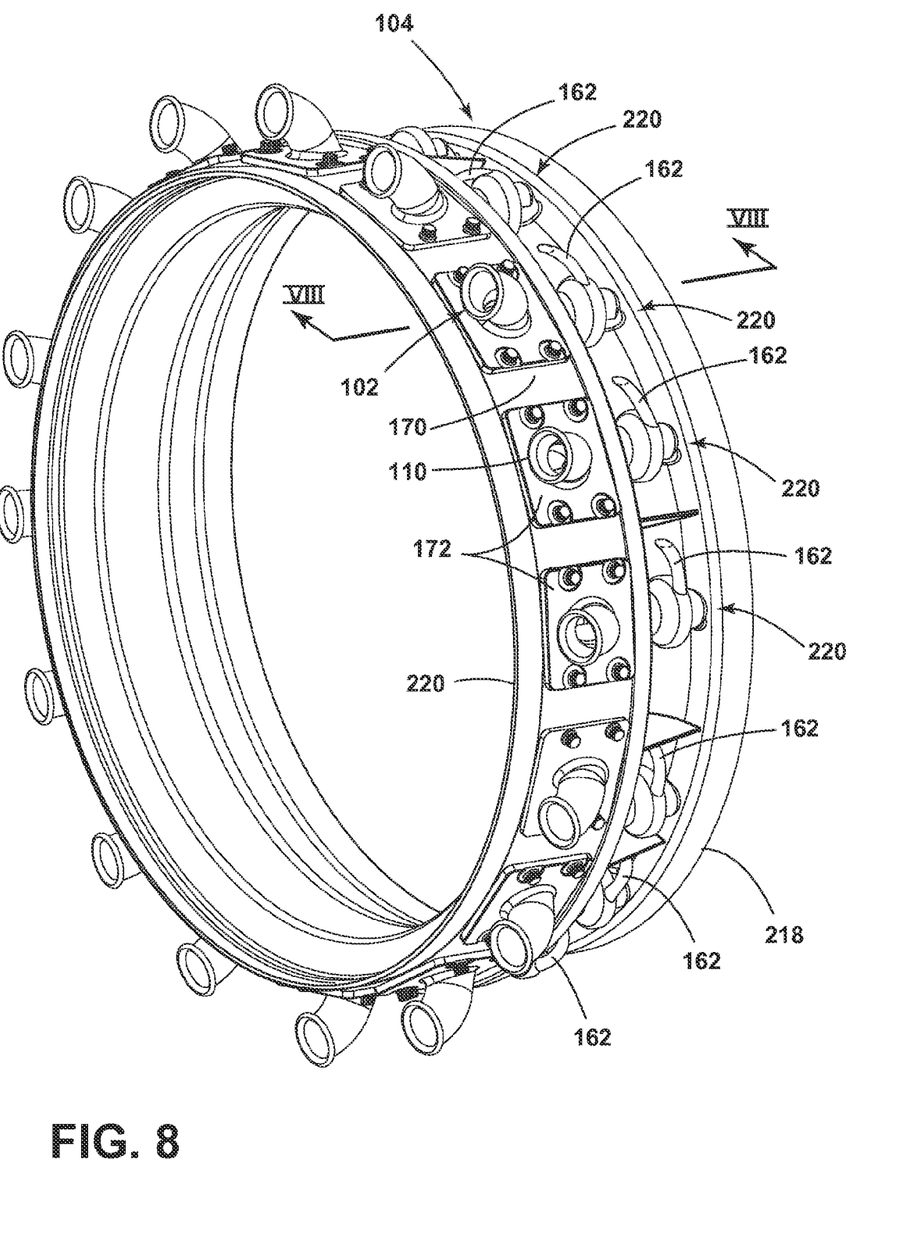
FIG. 8 is a perspective view illustrating the cyclonic separator coupled to the inducer section than can be incorporated in the engine of FIG. 1.

Turning to FIG. 8, a perspective view showing one example of an inducer section 104 that can be incorporated in the engine 10. The inducer section 104 includes the ring shaped band 170 having a plurality of cyclonic separators 102 and a ring-shaped disk 218 with a plurality of inducers 220, which can be integrally formed or molded with the ring-shaped band 170 and disk 218. The band 170 and disk 218 can define a disk centerline being coaxially aligned with the engine centerline 12. It should be appreciated that the number of cyclonic separators 102 with complementary inducers 220 is exemplary, and can include more or less based upon the particular engine 10. Additionally, the inlet 110 can be removed from one or more cyclonic separators 102, such that a cooling fluid is introduced radially into the cyclonic separators 102 without the need to turn the flow from an axial direction to having a radial and axial direction at the inlet conduit 140.

Figure 9:
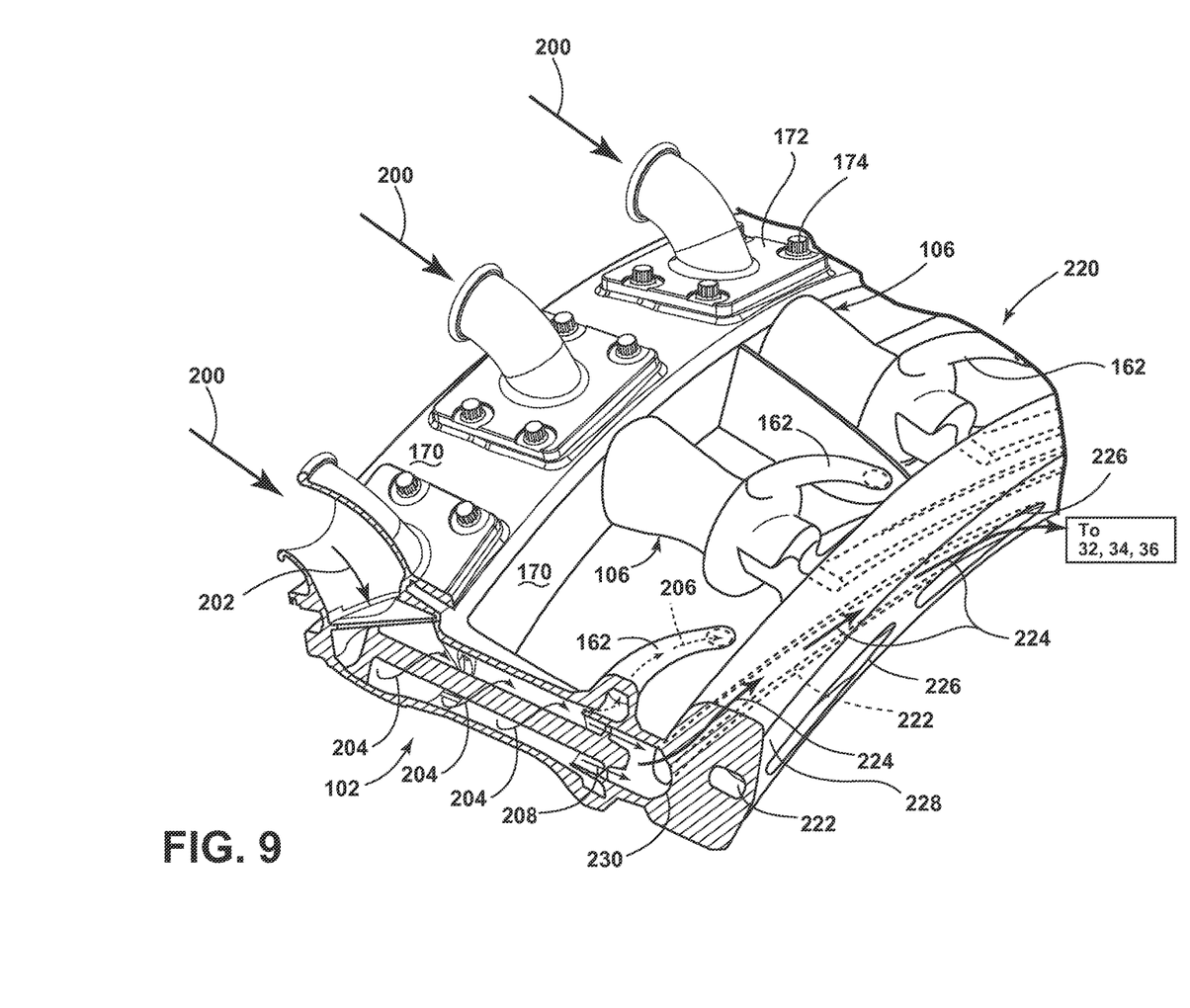
FIG. 9 is a close-up view of a portion of the inducer section of FIG. 8, illustrating the fluid flow through the cyclonic separator entering the inducer section.

FIG. 9 is a close-up view of a portion of the inducer section 104 of FIG. 8, showing the fluid flow through the inducer section 104 during operation and the tangential exit geometry of the scavenge outlet 162 and the cleaner air outlet 164. The cleaner air outlet 164 of the cyclonic separator 102 can be located upstream of the inducer 220 and can be in fluid communication with an inlet 230 of the inducer 220, such that the fluid stream supplied to the inducer 220 is the cleaner airflow 208 having a reduce amount of particular matter entrained therein. The inducer 220 can further comprise a turning passage 222. As illustrated, a downstream portion of the cleaner air outlet 164 can form a flow passage for the inducer 220, such that the cleaner air outlet 164 accelerates and turns the cleaner airflow 208 into the turning passage 222 toward the HP turbine 34 as an inducer flow 224. An outlet 226 for the turning passage 222 can be defined by an opening in a side face 228 of the ring-shaped disk 218 opposite of the cyclonic separator 102.

The cleaner air outlet 164 and the turning passage 222 can each define a longitudinal centerline, such that the respective centerlines are aligned to pass the cleaner airflow 208 tangentially relative to the annular volume 150. Additionally, the cleaner air outlet 164 and the turning passage 222 can define a flow streamline along the centerline such that the streamlines are aligned. Additionally, the cleaner air outlet 164 can be coupled to the inducer inlet 230 to define a cleaner air streamline, which can align with the flow streamline.

It should be appreciated that the cyclonic separator is beneficial for removing a volume of particular matter from a flow of cooling fluid moving within a cooling circuit defined through one or more engine components. Typical cyclonic or centrifugal separators utilized within turbine engines introduce air through a radial or axial inlet in combination with a swirler or swirler vanes to generate the cyclonic airflow for centrifugal separation. The tangential injection area eliminates the need for the swirlers, swirler vanes, or deflectors, generating a cyclonic airflow based upon the geometry of the cyclonic separator. Furthermore, smaller sizes of particulate matter can be removed as compared to standard particle separators, while maintaining minimal pressure loss within the system due to the scavenge flow. The advantage of removing smaller sizes also increases due to the smaller radius of the cyclonic separator as compared to typical separators. Additionally, manufacture of the cyclonic separator is simplified saving cost.

It should be further appreciated that the cyclonic separator as described herein comprises a compact size for use in turbine engines. The tangential injection and exit geometry remove the need for swirler vanes to deswirl the cyclonic airflow. The addition of the centerbody eliminates a low pressure center region of the annular volume, minimizing the need to centrifuge particles trapped within the center of the annular volume, increasing overall separator efficiency. Additionally, the simplicity of the cyclonic separator permits easy tuning for increasing inlet or outlet sections, as well as defining geometry based upon the desired sizes of the particulate matter to remove.

It should be further appreciated that the cleaner air outlet in combination with the inducer inlet provides cleaner air to the inducer assembly, which maximizes inducer efficiency. The cyclonic separator may be capable of providing up to 100% particle removal with a high inducer efficiency retention. Removed particles can be directed to retention chambers or included within a scavenge flow being directed to alternate engine components capable of operating with the entrained particular matter.

The various embodiments of systems, methods, and other devices related to the invention disclosed herein provide improved particle separation, particularly in a turbine engine. One advantage that can be realized in the practice of some embodiments of the described systems is that the various embodiments of systems, methods, and other devices disclosed herein can be used, alone or in combination, to remove particles from a cooling airflow in a turbine engine. The reduction of particles in the cooling air can improve cooling and engine component durability. The service life of aircraft engines is often limited by particle accumulation in turbine cooling passages, and so removal or significant reduction in particle accumulation increases the operational lifespan of engines between servicing.

This written description uses examples to disclose the invention, including the best mode, and to enable any person skilled in the art to practice the invention, including making and using any devices or systems and performing any incorporated methods. The patentable scope of the invention is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A gas turbine engine comprising:
   an engine core having a compressor section, a combustor section, and a turbine section in axial flow arrangement;
   a cooling air circuit fluidly coupling the compressor section to the turbine section; and
   a cyclonic separator comprising:
      a housing,
      a centerbody located within the housing defining an annular volume between the housing and centerbody as an annular cyclonic separating chamber;
      an inlet tangentially coupling the annular volume to the cooling air circuit,
      a cleaner air outlet coupling the annular volume to the cooling air circuit downstream of the inlet, and
      a scavenge outlet fluidly coupled to the annular volume;
   further comprising an inducer section axially upstream of the turbine section and having at least one inducer with a turning passage having an inlet coupled to the cyclonic separator cleaner air outlet and an outlet fluidly coupled to the turbine section;
   wherein a centerline of the inlet of the turning passage and the centerline of the cleaner air outlet are aligned.

2. A gas turbine engine comprising:
   an engine core having a compressor section, a combustor section, and a turbine section in axial flow arrangement;
   a cooling air circuit fluidly coupling the compressor section to the turbine section; and
   a cyclonic separator comprising:
      a housing defining an interior,
      a centerbody located within the interior to define an annular volume within the housing between the centerbody and the housing to form an annular cyclonic separating chamber,
      an inlet tangentially coupling the annular volume to the cooling air circuit,
      a cleaner air outlet coupling the annular volume to the cooling air circuit downstream of the inlet, and
      a scavenge outlet fluidly coupled to the annular volume;
   wherein the cyclonic separator inlet has a portion with a cross-sectional area to accelerate the cooling air; and
   wherein the portion has a continuously reducing cross-sectional area.

3. A gas turbine engine comprising:
   an engine core having a compressor section, a combustor section, and a turbine section in axial flow arrangement;
   a cooling air circuit fluidly coupling the compressor section to the turbine section; and
   a cyclonic separator comprising:
      a housing defining an interior,
      a centerbody located within the interior to define an annular volume within the housing between the centerbody and the housing to form an annular cyclonic separating chamber,
      an inlet tangentially coupling the annular volume to the cooling air circuit,
      a cleaner air outlet coupling the annular volume to the cooling air circuit downstream of the inlet, and
      a scavenge outlet fluidly coupled to the annular volume;
   wherein the cyclonic separator comprises a turning element for turning airflow located within the annular volume.

4. An inducer assembly for a gas turbine engine comprising:
   a disk comprising a plurality of circumferentially arranged inducers having a turning passage with an inlet and outlet and defining a flow streamline; and
   a plurality of cyclonic separators paired with the plurality of inducers, each of the cyclonic separators having an annular cyclonic separating chamber with an air inlet, a cleaner air outlet, and a scavenge outlet, and defining an annulus centerline;
   wherein the air inlet is tangential to the annular cyclonic separating chamber, the cleaner air outlet is coupled to the inducer inlet and defines a cleaner air outlet streamline, and the cleaner air outlet is coupled to the inducer inlet such that the cleaner air outlet streamline aligns with the inducer streamline.

5. The inducer assembly of claim 4 wherein the cyclonic separator air inlet has a portion with a reduced cross-sectional area to accelerate a flow of cooling air.

6. The inducer assembly of claim 5 wherein the portion has a continuously reducing cross-sectional area.

7. The inducer assembly of claim 4 wherein the cyclonic separators comprise a turning element located within the annular cyclonic separating chamber.

8. The inducer assembly of claim 4 wherein the scavenge outlet is tangential to the annular cyclonic separating chamber.

9. The inducer assembly of claim 4 wherein the disk defines a disk centerline, the cyclonic separators define a plurality of cyclonic centerlines, and the disk centerline and cyclonic centerlines are parallel or angularly offset.

10. The inducer assembly of claim 9 wherein the cyclonic centerlines are angularly offset from the disk centerline by a compound angle comprising both axial and radial components with respect to the disk centerline.

11. The inducer assembly of claim 10 wherein the cyclonic separators are arranged circumferentially about the disk centerline.

12. A gas turbine engine having an engine centerline and at least one cyclonic separator circumferentially arranged about the engine centerline, the at least one cyclonic separator having an annular cyclonic separating chamber with an air inlet, a cleaner air outlet, and a scavenge outlet, and defining an annulus centerline, wherein the air inlet is tangential to the annular separating chamber;
    further comprising an inducer assembly having a plurality of inducers circumferentially arranged about the engine centerline, the inducers having a turning passage with an inlet and outlet and defining a flow streamline, and the cleaner air outlet is coupled to the inducer inlet and defines a cleaner air outlet streamline, wherein the cleaner air outlet is coupled to the inducer inlet such that the cleaner air outlet streamline aligns with the inducer inlet streamline.

13. A gas turbine engine having an engine centerline and at least one cyclonic separator circumferentially arranged about the engine centerline, the at least one cyclonic separator having an annular cyclonic separating chamber with an air inlet, a cleaner air outlet, and a scavenge outlet, and defining an annulus centerline, wherein the air inlet is tangential to the annular cyclonic separating chamber;
    further comprising a turning element for turning airflow located within the annular cyclonic separating chamber upstream of the inducer inlet.

14. A turbine engine having an engine centerline, the turbine engine comprising:
    at least one cyclonic separator circumferentially arranged about the engine centerline, the at least one cyclonic separator having an annular cyclonic separating chamber defining an annulus centerline and having:
        an air inlet,
        a cleaner air outlet, and
        a scavenge outlet,
    wherein the air inlet is tangential to the annular cyclonic separating chamber;
    further comprising an inducer assembly having a plurality of inducers circumferentially arranged about the engine centerline, the inducers having a turning passage with an inlet and outlet and defining a flow streamline, and the cleaner air outlet is coupled to the inducer inlet and defines a cleaner air outlet streamline, wherein the cleaner air outlet is coupled to the inducer inlet such that the cleaner air outlet streamline aligns with the inducer inlet streamline.

15. A turbine engine having an engine centerline, the turbine engine comprising:
    at least one cyclonic separator circumferentially arranged about the engine centerline, the at least one cyclonic separator having an annular cyclonic separating chamber defining an annulus centerline and having:
        an air inlet,
        a cleaner air outlet, and
        a scavenge outlet,
    wherein the air inlet is tangential to the annular cyclonic separating chamber;
    further comprising a turning element for turning airflow located within the annular cyclonic separating chamber upstream of the cleaner air outlet.

\* \* \* \* \*